United States Patent
Takimoto et al.

(10) Patent No.: US 7,549,663 B2
(45) Date of Patent: Jun. 23, 2009

(54) AIRBAG DEVICE FOR PEDESTRIAN

(75) Inventors: Takayuki Takimoto, Tokyo (JP); Hiroyuki Takahashi, Aichi (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/087,569

(22) PCT Filed: Jan. 9, 2008

(86) PCT No.: PCT/JP2007/050083

§ 371 (c)(1),
(2), (4) Date: Jul. 10, 2008

(87) PCT Pub. No.: WO2007/086248

PCT Pub. Date: Aug. 2, 2007

(65) Prior Publication Data

US 2009/0000847 A1    Jan. 1, 2009

(30) Foreign Application Priority Data

Jan. 25, 2006   (JP) ............... 2006-016325

(51) Int. Cl.
*B60R 21/34* (2006.01)
(52) U.S. Cl. .................................... 280/274
(58) Field of Classification Search ............... 280/271, 280/274; *B60R 21/34*
See application file for complete search history.

(56) References Cited

U.S. PATENT DOCUMENTS

| | | | |
|---|---|---|---|
| 6,497,302 B2 * | 12/2002 | Ryan ......................... | 180/274 |
| 7,287,618 B2 * | 10/2007 | Okamoto et al. ............ | 180/274 |
| 7,341,274 B2 * | 3/2008 | Mori et al. ................ | 280/728.2 |
| 2007/0023222 A1 * | 2/2007 | Okamoto et al. ............ | 180/274 |
| 2007/0023223 A1 * | 2/2007 | Okamoto et al. ............ | 180/274 |
| 2009/0014988 A1 * | 1/2009 | Takimoto et al. ......... | 280/730.1 |

FOREIGN PATENT DOCUMENTS

| JP | H07-246908 | | 9/1995 |
|---|---|---|---|
| JP | H09-164906 | | 6/1997 |
| JP | 3212841 | | 7/2001 |
| JP | 2002-036986 | | 2/2002 |
| JP | 2003-312405 | | 11/2003 |
| JP | 2005-297725 | | 10/2005 |
| JP | 2006264386 A | * | 10/2006 |
| JP | 2007196788 A | * | 8/2007 |
| JP | 2007196789 A | * | 8/2007 |
| JP | 2007196790 A | * | 8/2007 |

* cited by examiner

*Primary Examiner*—Faye M. Fleming
(74) *Attorney, Agent, or Firm*—Manabu Kanesaka

(57) ABSTRACT

An airbag device for pedestrian is structured to inflate plural airbags side by side to suppress the impact to the pedestrian hit by the automobile at the area around the abutment portion between the adjacent airbags. An airbag 5L inflates to cover left half side of a rear edge portion of a hood 3, a cowl top 2 and a windshield 6 from the center of the automobile in a width direction, and an airbag 5R inflates to cover right half side. In the inflation state, the airbags 5L and 5R are brought into abutment around the center of the automobile in the width direction. Recess portions 10F and 10R are formed as cut portions of a front wall portion 8b and a rear wall portion 8c of an airbag storage case 8 from upper edge portions below the abutment portion between the airbags 5L and 5R.

6 Claims, 2 Drawing Sheets

AIRBAG DEVICE FOR PEDESTRIAN

TECHNICAL FIELD

The present invention relates to an airbag device for pedestrian, which includes an airbag that inflates along at least a part of a hood of an automobile body, and more particularly, to an airbag device for pedestrian, which allows a plurality of airbags to inflate side by side.

BACKGROUND ART

An airbag device for pedestrian structured to protect a pedestrian (pedestrian or bike rider) by an airbag which inflates along an area of the automobile body around a cowl is well known. An airbag device for pedestrian structured to allow a plurality of airbags to inflate side by side has been well known as described above (Japanese Unexamined Patent Application Publication No. 2003-312405).

[Patent Document 1] Japanese Unexamined Patent Application Publication No. 2003-312405

SUMMARY OF THE INVENTION

The present invention provides an airbag device for pedestrian, which is structured to allow a plurality of airbags to inflate side by side to reduce an impact exerted to a pedestrian who is hit by an area around an abutment portion of the adjacent airbags.

The present invention provides an airbag device for pedestrian including an airbag which inflates along at least a portion of a hood of an automobile body, a case for storing the airbag, and an inflator for inflating the airbag. The case includes a bottom portion, a front wall portion to a front side of the automobile, and a rear wall portion to a rear side of the automobile. The case extending in a width direction of the automobile body stores a plurality of airbags arranged at different positions in a longitudinal direction of the case such that the airbags adjacent in a lateral direction are brought into abutment upon inflation. Recess portions as cut portions of the front and rear wall portions of the case from upper edges thereof are positioned below the abutment portion between inflating airbags.

DETAILED DESCRIPTION

Figure 1:
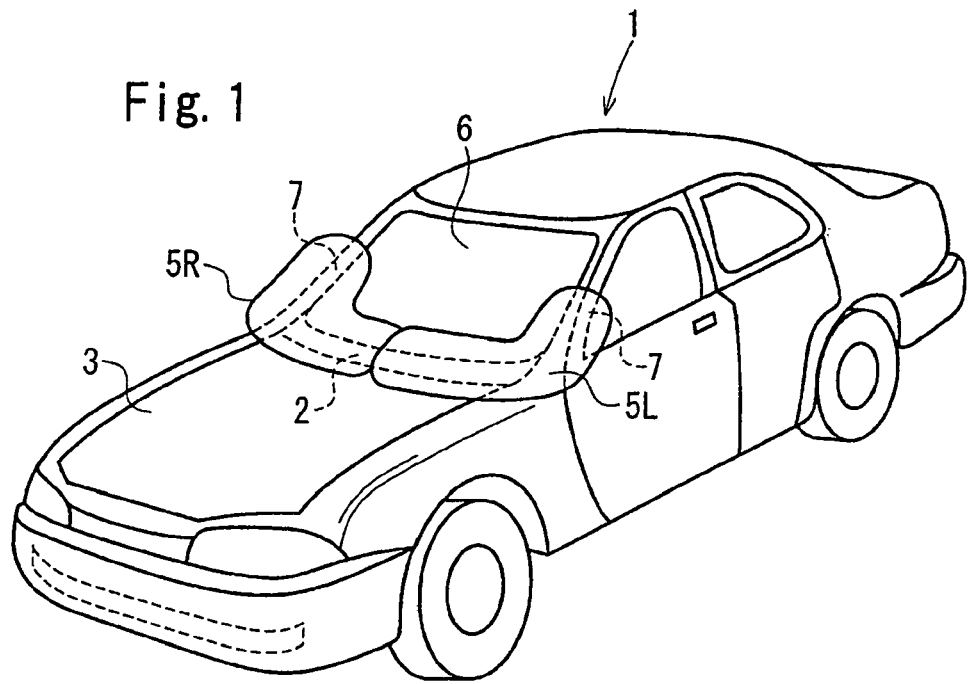
FIG. 1 is a perspective view of an automobile equipped with an airbag device for pedestrian according to an embodiment.

In an airbag device for pedestrian according to the present invention, a portion of a front wall and a rear wall of a case, which is positioned below an abutment portion between the airbags is formed as a recess portion. In the case where the pedestrian is hit by the area around the abutment portion between the adjacent airbags to be caught into the abutment portion, the pedestrian is unlikely to be in contact with the front wall and the rear wall portions of the case. This makes it possible to release or suppress the impact exerted to the pedestrian from the front wall and the rear wall portions.

The hood which exists around the recess portion may be easily deformed so as to get into the recess portion, thus providing the effect for absorbing the impact exerted to the pedestrian.

An embodiment of the present invention will be described referring to the drawings.

Figure 2:
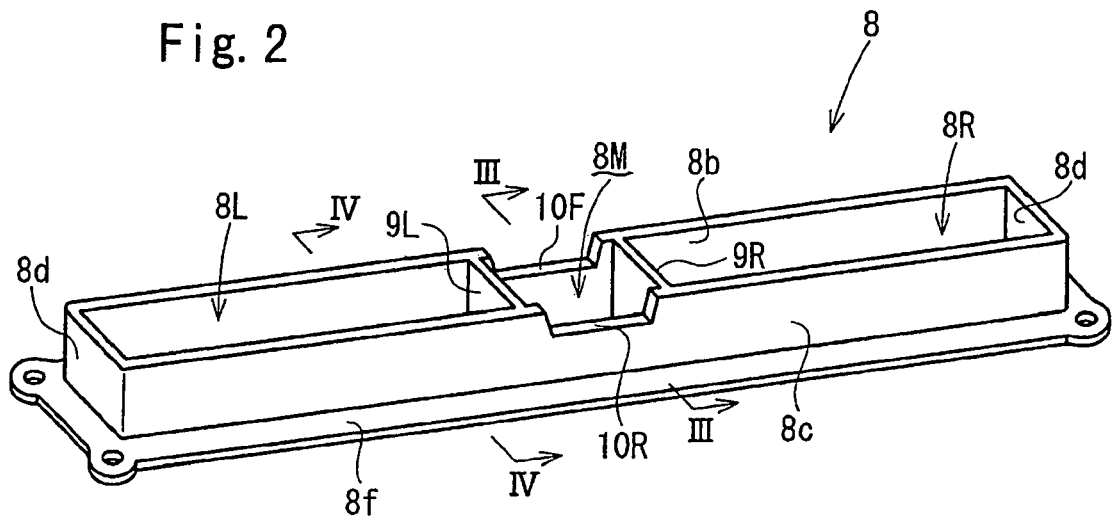
FIG. 2 is a perspective view of an airbag storage case.
Figure 3:
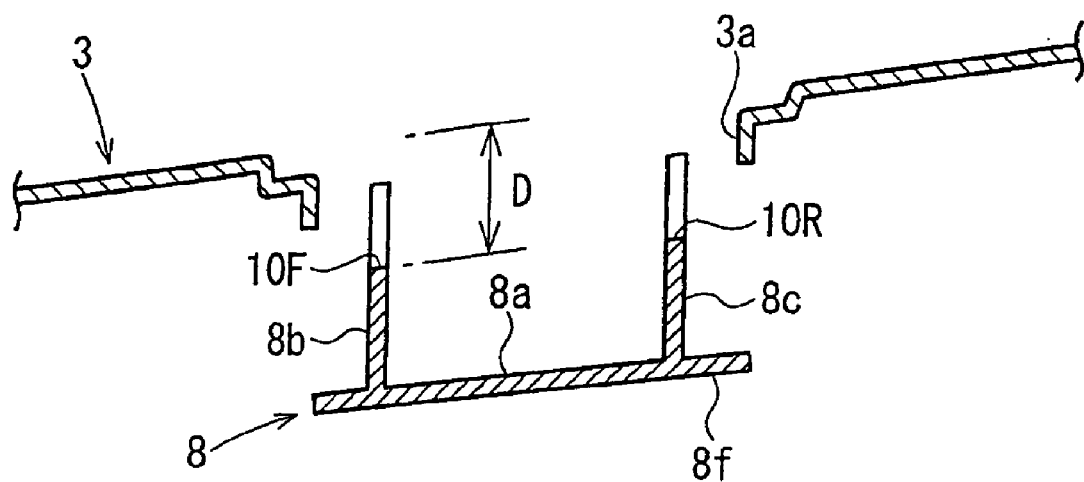
FIG. 3 is an enlarged sectional view of the automobile shown in FIG. 1 taken along line III-III shown in FIG. 2.
Figure 4:
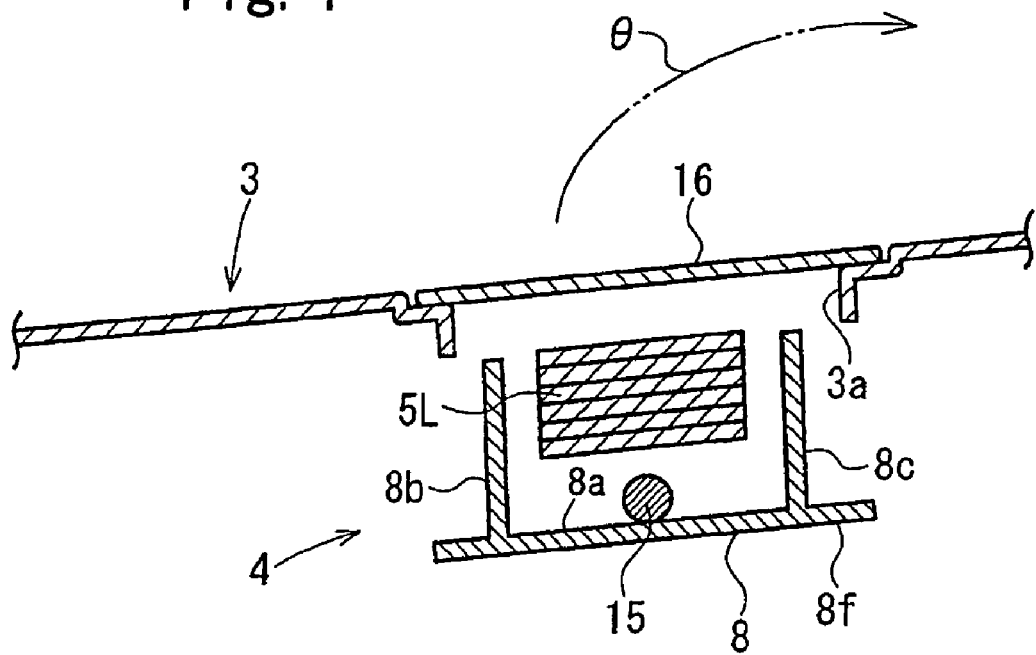
FIG. 4 is an enlarged sectional view of the automobile shown in FIG. 1 taken along line IV-IV shown in FIG. 2.

FIG. 1 is a perspective view of an automobile equipped with an airbag device for pedestrian according to the embodiment. FIG. 2 is a perspective view of an airbag storage case of the airbag device for pedestrian. FIGS. 3 and 4 are longitudinal sectional views each showing the portion of the automobile around the airbag device along the longitudinal direction, wherein FIG. 3 is an enlarged sectional view taken along line III-III shown in FIG. 2, and FIG. 4 is an enlarged sectional view taken along line IV-IV shown in FIG. 2.

Referring to FIG. 1, an automobile 1 shown as a four-door sedan model in the present invention is not limited to the specific model. An airbag device 4 for pedestrian is disposed to the rear of a hood 3. As shown in the drawing, airbags 5L and 5R of the airbag device for pedestrian inflate to cover a rear edge portion of the hood 3, a cowl top 2, and at least a part of a windshield 6, and left and right A pillars 7.

The airbag 5L inflates to cover the left half side of the rear edge portion of the hood 3, the cowl top 2, and the windshield 6 from the portion around the center in the width direction of the automobile (lateral direction), and the airbag 5R inflates to cover the right half side. During inflation, the airbags 5L and 5R are in an abutment state around the center of the automobile in the width direction.

The airbag device for pedestrian includes a case 8 for storing the airbags 5L and 5R each in a folded state, an inflator 15 for inflating the airbags 5L and 5R, and a lid 16 (not shown in FIG. 3) which closes an opening 3a of the hood 3 for allowing passage of the airbag.

The case 8 has a long box-like shape extending in the width direction of the automobile. The case 8 has an open top surface, and further includes a bottom portion 8a, a front wall portion 8b, a rear wall portion 8c, and left and right end walls 8d, 8d. A flange 8f is provided around the outer circumference of the case 8 so as to be fixed to an automobile body member. An opening (code is omitted) through which the fixture such as a bolt is inserted is formed in the flange 8f. The case 8 is disposed at the back side of the hood 3 such that the open top surface faces the opening 3a, and fixed to the hood 3 via the flange 8f.

In the embodiment, partitions 9L and 9R are provided at different positions around the center of the case 8 in the longitudinal direction for separating the case 8 into airbag storage chambers 8L, 8R at left and right sides of the automobile body, and an intermediate chamber 8M therebetween.

In the embodiment, the folded airbags 5L and 5R, and the inflators corresponding to the airbags 5L and 5R are disposed in the respective airbag storage chambers 8L and 8R. The intermediate chamber 8M is in an unoccupied state.

The inflated airbags 5L and 5R are brought into abutment above the intermediate chamber 8M. In the embodiment, notch-like recess portions 10F and 10R are formed to face the intermediate chamber 8M as cut portions of the front wall portion 8b and the rear wall portion 8c of the case 8 from the upper edge. Each of the recess portions 10F and 10R is formed over substantially an entire width of the intermediate chamber 8M.

In the embodiment, each lateral width of left and right recess portions 10F and 10R is preferably set to be in the range from 50 to 300 mm, and more preferably from 100 to 200 mm. It is preferable to set a distance D from the top surface of the hood 3 to each lowest portion of the recess portions 10F and 10R to a value ranging from 5 to 20 mm, and more preferably to 10 to 20 mm.

The lid at the rear edge of the automobile is hinged to a rear edge of the opening 3a, which is not shown in the drawing so as to be opened while turning rearward in response to inflation of the airbags 5L and 5R. A front edge of the lid is attached to a front edge of the opening 3a with a clip (not shown). The clip is structured to release the locked state upon opening of the lid pushed by the airbags 5L and 5R.

In the case where the pedestrian is hit by the automobile equipped with the above-structured airbag device for pedestrian, the inflator is activated based on a detection signal of a sensor (not shown) for detecting collision of the pedestrian. Then the airbags 5L and 5R start inflating by injected gas. The lid is pushed by the expanding airbags 5L and 5R so as to be opened, and the airbags 5L and 5R deploy along the outer surface of the automobile body as shown in FIG. 1. The inflated airbags 5L and 5R are brought into abutment around the center of the automobile body in the width direction.

In the airbag device for pedestrian, the recess portions 10F and 10R are formed at an area of the front wall portion 8b and the rear wall portion 8c of the case 8 below the abutment portion between the airbags 5L and 5R (the portion that faces the intermediate chamber 8M). In the case where the pedestrian is hit by the area around the abutment portion between the airbags 5L and 5R, and is caught into the abutment portion, the pedestrian is unlikely to be brought into contact with the front wall portion 8b and the rear wall portion 8c of the case 8. This makes it possible to release or suppress the impact from the front wall portion 8b and the rear wall portion 8c to the pedestrian.

In the embodiment, the hood 3 (edge portion of the opening 3a) exists above the recess portions 10F and 10R as shown in FIG. 3. The hood 3 (edge portion of the opening 3a) may be relatively easily deformed to get into the recess portions 10F and 10R easily, thus providing the effect for absorbing the impact exerted to the pedestrian.

In the embodiment, the intermediate chamber (unoccupied chamber) 8M is defined by the left and right airbag storage chambers 8L and 8R, and the recess portions 10F and 10R are formed to face the intermediate chamber 8M. However, the intermediate chamber 8M may be omitted such that the recess portions 10F and 10R are formed astride the adjacent storage chambers 8L and 8R.

The above embodiments are examples which are not limited to the present invention. For example, the partitions 9L and 9R may be omitted. Each of the recess portions 10F and 10R has the angled recess shape. However, they may have gentle recess shapes with no angle.

The present invention is based on the disclosure of Japanese Patent Application No. 2006-16325 filed on Jan. 25, 2006, and incorporated herein by reference in its entirety.

The invention claimed is:

1. An airbag device for pedestrian including an airbag which inflates along at least a portion of a hood of an automobile body, a case for storing the airbag, and an inflator for inflating the airbag, wherein:

the case includes a bottom portion, a front wall portion to a front side of the automobile, and a rear wall portion to a rear side of the automobile;

the case extending in a width direction of the automobile body stores a plurality of airbags arranged at different positions in a longitudinal direction of the case such that the airbags adjacent in a lateral direction are brought into abutment upon inflation; and recess portions as cut portions of the front wall portion and the rear wall portion of the case from upper edges of the front and the rear wall portions are positioned below the abutment portion between inflating airbags.

2. The airbag device for pedestrian according to claim 1, wherein:

the case includes a left airbag storage chamber, a right airbag storage chamber, and an intermediate chamber therebetween; and the recess portions are formed in portions of the front wall portion and the rear wall portion to face the intermediate chamber.

3. The airbag device for pedestrian according to claim 2, wherein partitions are formed between the intermediate chamber and the left airbag storage chamber, and the intermediate chamber and the right airbag storage chamber, respectively.

4. The airbag device for pedestrian according to claim 3, wherein the recess portion is formed over substantially an entire width of the intermediate chamber.

5. The airbag device for pedestrian according to claim 1, wherein the recess portion has a lateral width in a range from 50 to 300 mm.

6. The airbag device for pedestrian according to claim 1, wherein a distance from a top surface of the hood to a lowest portion of the recess portion is in a range from 5 to 20 mm.

* * * * *